Patented Jan. 30, 1951

2,539,626

UNITED STATES PATENT OFFICE 2,539,626

METHOD OF TREATING COFFEE TO PRESERVE FLAVORING AND AROMATIC PRINCIPLES

John L. Kellogg, Chicago, Ill.; Helen Louise Kellogg executrix of said John L. Kellogg, deceased No Drawing. Application May 28, 1948,
Serial No. 29,933

4 Claims. (Cl. 99—167)

This invention relates to a method of treating coffee to preserve, within the coffee bean fibers, the flavoring and aromatic principles developed during the roasting process, and to improve the appearance and flavor of the coffee beverage made from the treated coffee.

It is well known that the flavor and aroma of coffee is developed by the high temperatures used during the roasting process and that the flavoring and aromatic substances deteriorate when the roasted coffee is exposed to the atmosphere for substantial periods of time. This deterioration and loss of flavor and aroma occurs both in the roasted half bean or when the coffee is ground, but the deterioration is more rapid when the fibers of the bean are broken by grinding. For this reason it has been customary, heretofore, to seal the coffee in substantially air tight bags and cartons. In some instances the coffee is packed in hermetically sealed tins.

A principal object of the present invention is to provide a simple, but highly effective method of treating roasted coffee to minimize the deleterious effect of the atmosphere on the flavor and aroma thereof and to accomplish this result by the utilization of a substance which, when the treated coffee is used in a beverage, will improve the appearance and flavor of the beverage.

According to the present invention, freshly roasted coffee, either before or after it has been ground and while it still remains warm from the roasting process, is coated with raw egg composed of both the yolk and whites beaten together to form a thin egg paste, the temperature of the coffee being such as to expand the porous cellular structure of the coffee but is not sufficient to cook the albumin and other substances in the egg paste. The egg paste forms a thin sealing coat or envelope enclosing the coffee bean and/or ground coffee and thereby prevents the escape of the flavoring and aromatic principles developed during the roasting process. The egg paste, being applied while the coffee is warm and expanded, enters all surface openings and into the pulp interior of the ground particles.

The coffee and the liquid coat thereon is then dried until the moisture content of the coffee and egg paste coating is at or below 4% so as to avoid development of rancidity in the egg coating.

When the treated coffee is used in brewing a coffee beverage, the albumin and the yolk of the raw egg paste will dissolve in the liquid and thereby serve, not only as a clarifier to provide a pleasing amber color, but also modifies the strong coffee acids and materially improves the flavor of the coffee, whereby lower grades of coffee may be used in the brewing of a high grade beverage.

When utilizing my improved process to apply egg coating to coffee, the several substances are preferably mixed in the following proportions:

Example No. 1

1. 100 pounds freshly roasted coffee beans.
2. 1½ to 3 pounds of raw egg thoroughly beaten to unite the yolk and whites.

The coffee in the amount above specified, after being roasted, is cooled to approximately 150° Fahrenheit. Preferably the hot coffee is agitated during the cooling so as to insure a uniform temperature throughout the entire body.

Raw eggs, in the amount of 1½ to 3 pounds, are thoroughly beaten to mix the yolk thereof with the white of the eggs and to form a thin paste. This paste is then mixed with the coffee beans while the latter is at approximately 150° Fahrenheit. At this temperature the thin egg paste will permeate the entire body of coffee without being cooked and thereby form a thin gelatinous coat on the coffee beans so as to seal any openings in the outer surface of the bean and in the folds forming the recess leading into the interior of the bean. The temperature of the coffee serves to dry the egg coating without cooking the same. If the temperature of the coffee does not thoroughly dry the egg coating, the coffee is subjected to a low temperature drying operation. Such drying temperatures are maintained below 150° Fahrenheit.

After the coated coffee is dried sufficiently to reduce the moisture content thereof to approximately 4% or less, the batch of coffee being treated is permitted to cool to room temperatures. The low moisture content of the egg coating insures the product against the development of rancidity.

Example No. 2

1. 100 pounds of freshly roasted and ground coffee.
2. 1½ to 3 pounds of fresh liquid egg.

The coffee is ground to preferably a medium grind preliminary to applying the egg coating. Because of the larger surface area of the ground coffee particles, the coating of the egg paste material, as applied to the ground particles, may be somewhat thinner than in the Example No. 1, but the coating will be sufficiently thick to seal the openings in the surface of the coffee material and thereby prevent the escape of the flavoring and aromatic principles therefrom.

When the coffee bean is ground for use in a coffee beverage, or when the ground coffee of Example No. 2 is used for that purpose, the dry egg coating on the coffee particles is dissolved in the liquid to form an emulsion which serves to clarify and improve the flavor of the beverage. The major portion of the albumin content of the egg will be cooked with the temperatures ordinarily used in brewing coffee, and this material will remain with the coffee grounds after the water solubles of the coffee and egg coating have been withdrawn from the coffee grounds.

From the above it will be seen that the present invention provides a simple and economical method of providing a roasted coffee product containing a clarifying agent which, when dried, functions to seal all openings in each particle of coffee so as to prevent the escape of the high volatile aromatic principles, when the coffee products it exposed to the atmosphere, but which when the coffee is used in the brewing of a liquid beverage, returns to a liquid form and functions as an agent for clarifying the liquid beverage.

I claim:

1. The method of treating roasted coffee which comprises coating the half coffee beans with a thin homogenous paste composed only of raw egg while the temperature of the coffee is maintained at approximately 150° Fahrenheit and thereafter permitting the material to cool to room temperatures, whereby the heat of the coffee is utilized to dry the egg coating.

2. The method of treating coffee comprising roasting the coffee and cooling the same to 150° Fahrenheit, beating a quantity of raw eggs including both the white and yolk thereof to provide a thin homogenous paste and adding the egg paste to the coffee while the latter is stirred and at a temperature of approximately 150° Fahrenheit and thereafter drying the material at temperatures sufficiently low to prevent cooking the egg coating.

3. The method of treating coffee which comprises roasting the coffee and thereafter cooling the same to 150° Fahrenheit, beating raw eggs to form a homogenous paste including both the white and yolk thereof in amount of 1½% to 3% of the weight of the coffee and mixing the egg material with the hot coffee while the latter is kept in agitation so as to distribute the egg material throughout the batch, continuing the agitation of the egg coated coffee until the egg coating becomes dry.

4. The method of treating freshly roasted and ground coffee to provide the coffee particles with a thin coating of raw egg paste which comprises beating raw eggs to form a homogenous paste including both the white and yolk and in the amount of 1½% to 3% by weight of the roasted coffee used and adding this egg paste to the ground coffee while the said coffee is maintained at a temperature of approximately 150°; the coffee being stirred to uniformly distribute the egg ingredient throughout the bath and to insure uniform drying of the product without cohesion of the particles.

JOHN L. KELLOGG.

REFERENCES CITED

The following references are of record in the file of this patent:

UNITED STATES PATENTS

| Number | Name | Date |
| --- | --- | --- |
| Re. 5,933 | Berry | June 23, 1874 |
| 73,486 | Arbuckle, Jr. | Jan. 21, 1868 |
| 205,356 | Cooke | June 25, 1878 |
| 2,210,819 | Reynolds | Aug. 6, 1940 |